(No Model.)

J. M. PHILLIPS.
LATCH FOR DUMPING CAR DOORS.

No. 507,721. Patented Oct. 31, 1893.

Witnesses:
J. B. McGirr.
M. R. Snyder.

Inventor
John M. Phillips
G. Connolly Bro.
Atty

UNITED STATES PATENT OFFICE.

JOHN M. PHILLIPS, OF BALDWIN, PENNSYLVANIA.

LATCH FOR DUMPING-CAR DOORS.

SPECIFICATION forming part of Letters Patent No. 507,721, dated October 31, 1893.

Application filed February 4, 1893. Serial No. 461,037. (No model.)

*To all whom it may concern:*

Be it known that I, JOHN M. PHILLIPS, a citizen of the United States, residing at Baldwin township, in the county of Allegheny and State of Pennsylvania, have invented certain new and useful Improvements in Latches for Car-Doors; and I do hereby declare the following to be a full, clear, and exact description of the invention, such as will enable others skilled in the art to which it appertains to make and use the same.

My invention has relation to latches for car doors and relates in particular to latches for that class of car doors which are hinged at the top and swing outwardly, such as the doors of coal and other dumping cars.

The object of my invention is to provide a simple and substantial latch which may be readily attached and which will engage the outside of a swinging car door at the center and bottom of the same.

The appliances heretofore in use for the purpose of latching car doors have been unsatisfactory by reason of the difficulty of operating them, the appliances most commonly used being either a chain attached to the inside of the car, passing through the door and secured on the outside by a pin; or a long lever pivoted on the outside of the door and held at each end by a hook pivoted on the side of the car.

My invention consists of a lever attached to the outside of the car door and near the bottom of the same by a pivot-pin and a guard plate, in combination with a hinged loop or staple attached to the bottom of the car and adapted to be swung into position in front of the door and held in such position by the pivoted lever.

My invention further consists in the novel construction, combination and arrangement of parts hereinafter described and specifically claimed.

Referring to the accompanying drawings, in which—

Figure 1:
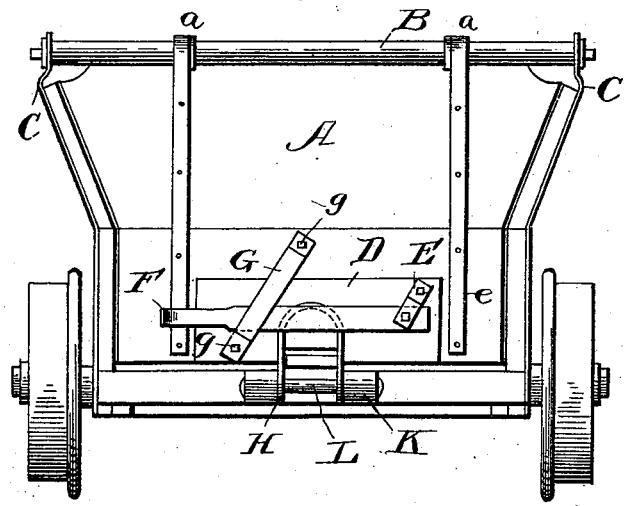
Figure 2:
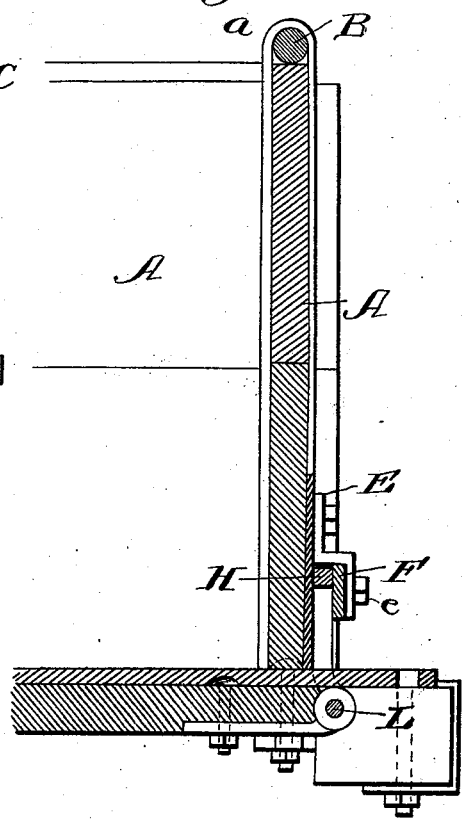
Figure 3:
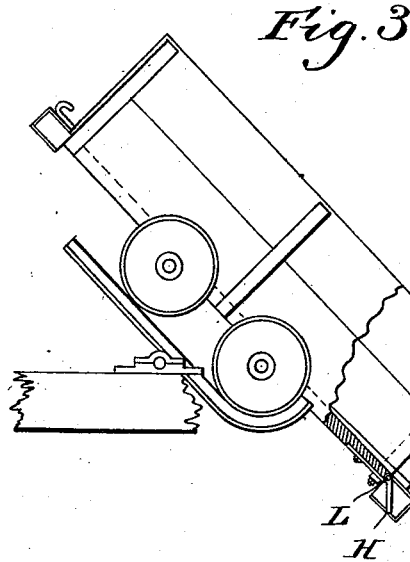
Figure 4:
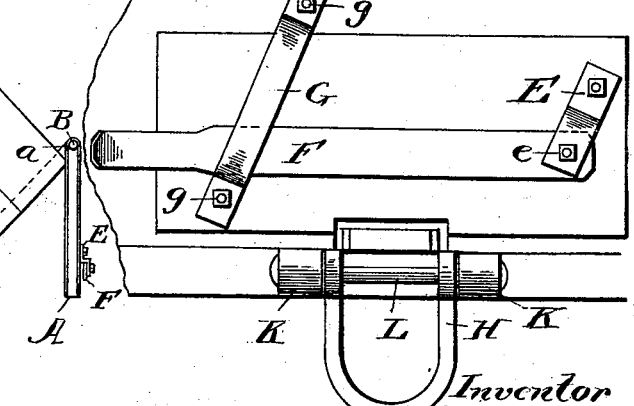

Figure 1, is an end view of a car having my improvements applied, the latch being fastened; Fig. 2, a side elevation of the same, partly in section; Fig. 3, a side elevation, partly in section, the latch being unfastened and the car door open; Fig. 4, an end view of a car having my improvements applied, the latch being unfastened.

A, designates the car door hinged in the usual manner by hinges $a$, $a$, and a rod B, passing through plates C, C, projecting above the sides of the car. Upon the outside of the door A, and near the bottom of the same I place a metallic plate D, and securely bolt the plate to the door. A clip E, is secured to the plate D, and a bolt $e$, passing through the clip and plate serves to pivotally attach a lever F, to the plate. The lever F, extends horizontally across the plate D, and is held against the plate by a guard or keeper G, which passes over the lever near its free end and is bolted to the plate D, and to the door above the plate by bolts $g$, $g$. A loop or hasp H, is hinged to the rear end of the bottom of the car by means of brackets K, K, and a bolt L, passing through the brackets and through eyes in the ends of the loop or hasp. The bottom of the car is cut away between the brackets K, K, so as to allow the loop or hasp to swing down out of the way of the door when the latter is opened, this position of the loop or hasp being clearly shown in Figs. 3 and 4 of the drawings. When the door is closed and the latch fastened the loop or hasp stands in a vertical position against the outside of the door and is held in this position by the lever F, which when depressed passes around the upper end of the loop and presses it closely against the plate D. To unfasten the door it is only necessary to raise the free end of the lever F, until it is clear of the loop or hasp H. The dumping of the car will force the door A, open and the latter pressing against the loop or hasp will cause the same to swing around on its hinge bolt L, and fall into the position shown in Figs. 3 and 4, in which position it is entirely out of the way of the door and of the material falling from the car. After the car has been dumped and as it assumes a horizontal position the door will swing back to a perpendicular position and the latch can then be fastened by raising the lever F, then swinging the loop or hasp H, up into contact with the plate D, and finally pressing the lever F, down so as to confine the loop or hasp between the lever and the plate.

Having described my invention, I claim—

1. In a latch for car doors, the combination with a door hinged at its top and adapted to swing outwardly from its bottom, of a lever pivoted on the door and a loop or hasp hinged to the bottom of the car and adapted to be held up against the door by the said lever, substantially as described.

2. In a latch for car doors, the combination with a hinged door, a plate bolted to said door and a lever pivotally secured to said plate, of a loop or hasp hinged to the bottom of the car and adapted to be swung up against said plate and be engaged by said lever, substantially as described.

3. In a latch for car doors, the combination with the door A, hinged at its upper edge, the plate D, secured to the door, the lever F, pivotally attached to the plate and the guard or keeper G; of the loop or hasp H, hinged to the bottom of the car and adapted to be engaged by said lever, substantially as described.

In testimony whereof I have affixed my signature in presence of two witnesses.

JOHN M. PHILLIPS.

Witnesses:
J. H. HARRISON,
J. BOYD DUFF.